J. L. R. HAYDEN.
ELECTROCHEMICAL PROCESS.
APPLICATION FILED FEB. 11, 1910.
1,072,945.
Patented Sept. 9, 1913.
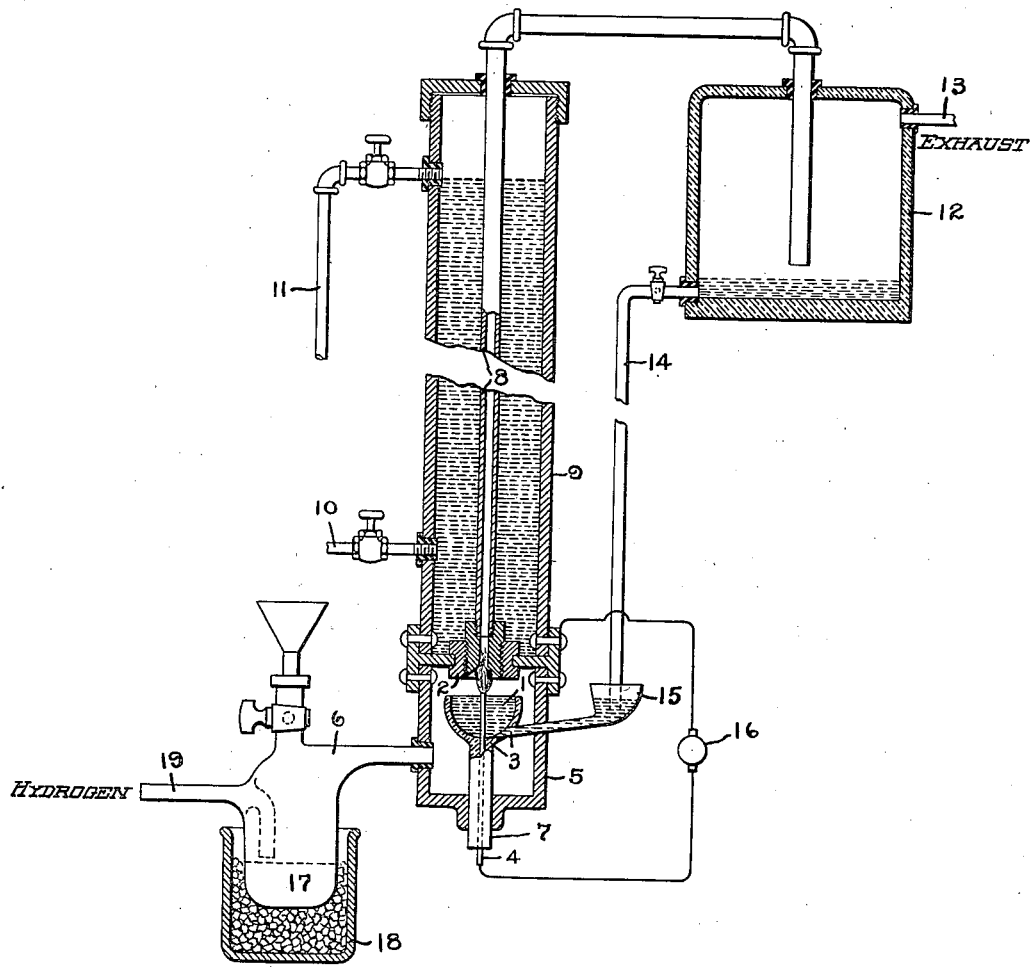
WITNESSES:
J. Earl Ryan
J. Ellie Elen
INVENTOR:
JOSEPH L. R. HAYDEN,
BY
HIS ATTORNEY

UNITED STATES PATENT OFFICE.

JOSEPH L. R. HAYDEN, OF SCHENECTADY, NEW YORK, ASSIGNOR TO GENERAL ELECTRIC COMPANY, A CORPORATION OF NEW YORK.

ELECTROCHEMICAL PROCESS.

1,072,945. Specification of Letters Patent. Patented Sept. 9, 1913.

Application filed February 11, 1910. Serial No. 543,261.

*To all whom it may concern:*

Be it known that I, JOSEPH L. R. HAYDEN, a citizen of the United States, residing at Schenectady, county of Schenectady, State of New York, have invented certain new and useful Improvements in Electrochemical Processes, of which the following is a specification.

My invention relates to the production of chemical reactions in mixtures of substances by means of an electric arc.

It has been observed that certain compounds and elements which are inert with respect to one another under ordinary conditions, can be made to interact with the formation of compounds when mixtures of these substances are subject to the influences of an electric arc. It has formerly been believed that this chemical activity in the arc is entirely due to the high temperature existing therein, but my observations indicate that the chemical activity is due in part at least to an electrical effect which is distinct from the purely thermal action of the arc. A high temperature in the arc, therefore, represents a waste of energy.

According to my invention I subject the reaction mixture to a low temperature arc such as is formed when the cathode consists of easily vaporizable material, such as mercury, zinc, cadmium, or of easily vaporizable alloys.

For the purpose of illustration, I will describe my invention as applied to the reaction between boric chlorid and hydrogen to form elemental boron, but it is, of course, to be understood that my process is a general one. Other reactions may be carried on to advantage in a similar manner in a low temperature arc. Synthetic reactions, as for example, the oxidation of nitrogen can be carried out in the same way.

The accompanying drawing is a diagrammatic representation of an apparatus for the carrying out of my invention.

The arc is formed between cathode 1, which consisting of an easily vaporizable material, as mercury, and a perforated anode 2, consisting of copper, or other material inert under the conditions. The metal forming the cathode is contained in a receptacle 3 consisting of some refractory material, such as lava. Current connection to electrode 1 is made by conductor 4 which, if desired, may project above the surface of the vaporizable metal, thereby serving to fix the cathode spot of the arc. The arc is surrounded by a chamber 5 which communicates with a suitable receptacle 6 for introducing the reaction mixture. The leading-in conductor 4 is insulated from the chamber 5 by means of the lava bushing 7. The perforated electrode 2 communicates with a metallic tube 8, which is surrounded by a water jacket 9. The tube 8 and its surrounding water jacket have been shown broken, as their length may vary somewhat. The water jacket is provided with an intake pipe 10 and an overflow pipe 11. The water serves to cool the products of the reaction and the metal vapor derived from the electrode 1. The tube 8 is led into a chamber 12 in which the condensed metal and the products of the reaction collect. Unacted upon gases or gaseous reaction products escape through the outlet pipe 13 of this chamber. The condensed electrode material is returned to the negative electrode by means of a pipe 14 which projects into the funnel 15. The electrodes are connected as indicated to some suitable source of direct current 16.

When a mixture of boric chlorid and hydrogen is to be acted upon by the arc the liquid boric chlorid 17 is contained in the vessel 6 which is surrounded by a cooling mixture contained in the vessel 18. The hydrogen is supplied through a tube 19 projecting immediately above the surface of the boric chlorid and in this manner carries with it vaporized boric chlorid into the arc chamber 5. The gases are preferably introduced at reduced pressure. The movement of the gas stream is conveniently produced by connecting tube 13 to an exhaust pump, thereby drawing the gases at the desired rate and pressure through the arc.

The boric chlorid and hydrogen interact according to the following reaction:

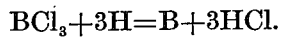
$$BCl_3 + 3H = B + 3HCl.$$

The reduced boron is carried in the form of a powder through the tube 8 into the chamber 12. The vaporized mercury or other metal collects in the bottom of the chamber and is returned at a suitable rate to the receptacle 3 by adjusting the stop cock in the tube 14. The unused hydrogen and the hydrochloric acid gas together with any unused boric-chlorid vapor is withdrawn from the chamber 12 by the exhaust pump.

What I claim as new and desire to secure by Letters Patent of the United States, is:—

1. The process which consists in producing a chemical change in gases which consists in passing said gases through a low temperature arc.

2. The process which consists in producing a chemical change in a gaseous mixture which consists in passing said mixture through a mercury arc.

3. The process which consists in producing a chemical change in a gaseous mixture which consists in passing said mixture at low pressure through a low temperature arc.

4. The process which consists in producing a chemical change in a gaseous mixture which consists in passing said mixture through a short, low temperature, low voltage arc.

5. The combination of an easily vaporizable cathode, a coöperating anode, means for producing an arc between said electrodes, and means for passing a gaseous reaction mixture through said arc.

6. The combination of a mercury cathode, a copper anode means for producing an arc between the same and means for introducing vapors to be chemically acted upon into said arc.

In witness whereof, I have hereunto set my hand this 9th day of February, 1910.

JOSEPH L. R. HAYDEN.

Witnesses:
 BENJAMIN B. HULL,
 HELEN ORFORD.